United States Patent
Kinoshita et al.

(10) Patent No.: US 7,486,670 B2
(45) Date of Patent: Feb. 3, 2009

(54) METHOD FOR PACKET COMMUNICATION AND COMPUTER PROGRAM STORED ON COMPUTER READABLE MEDIUM

(75) Inventors: Yusuke Kinoshita, Tokyo (JP); Keiichi Shimizu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1000 days.

(21) Appl. No.: 09/814,720

(22) Filed: Mar. 23, 2001

(65) Prior Publication Data

US 2001/0036184 A1 Nov. 1, 2001

(30) Foreign Application Priority Data

Mar. 27, 2000 (JP) .............................. 2000-086321

(51) Int. Cl.
*H04L 12/28* (2006.01)

(52) U.S. Cl. .................. 370/389; 370/465; 709/245

(58) Field of Classification Search ................ 370/389, 370/400, 241, 254
See application file for complete search history.

(56) References Cited

U.S. PATENT DOCUMENTS

| | | | | |
|---|---|---|---|---|
| 6,434,627 B1 * | 8/2002 | Millet et al. | ................. | 709/245 |
| 6,442,616 B1 * | 8/2002 | Inoue et al. | ................. | 709/245 |
| 6,501,767 B1 * | 12/2002 | Inoue et al. | ................. | 370/465 |
| 6,515,974 B1 * | 2/2003 | Inoue et al. | ................. | 370/331 |
| 6,591,306 B1 * | 7/2003 | Redlich | ..................... | 709/245 |

FOREIGN PATENT DOCUMENTS

| | | |
|---|---|---|
| JP | 10-257105 | 9/1998 |
| JP | 10-303981 | 11/1998 |
| JP | 11-068842 | 3/1999 |

OTHER PUBLICATIONS

I. Akira, et al., Information Processing Society of Japan Research Report 99-MBL-8-1, vol. 99, No. 13, pp. 1-8, "A Method For Realizing IP Mobility Between IMP-2000 and FWA Based on Mobile IP Protocol", Mar. 5, 1999 (with partial English translation).
Charles E. Perkins, et al., "Private Addresses in Mobile IP", http://www.ietf.org/proceedings/99jul/1-D/draft-ietf-mobileip-privaddr-00.txt, XP-002301262, Jun. 25, 1999, (9 Pages).
Rhandeev Singh, et al., "RAT: A Quick (And Dirty?) Push for Mobility Support", IEEE, 1999, pp. 32-40.
C. Perkins, "IP Mobility Support", Network Working Group Request for Comments: 2002 Category: Standards Track, Oct. 1996, pp. 1-61.

\* cited by examiner

*Primary Examiner*—Chi H Pham
*Assistant Examiner*—Albert T Chou
(74) *Attorney, Agent, or Firm*—Oblon, Spivak, McClelland, Maier & Neustadt, P.C.

(57) ABSTRACT

A method for packet communication including: sending a packet, by a node configured to be moved among different networks, the packet including a sender address being a private sender address; changing the sender address from the private sender address to a global address, even when the sending is performed in any of the different networks.

19 Claims, 17 Drawing Sheets

FIG. 3
BACKGROUND ART

| TYPE | LENGTH | SEQUENCE NUMBER | | | | | | | |
|------|--------|-----------------|---|---|---|---|---|---|---|
| REGISTRATION LIFE TIME | | R | B | H | F | M | G | V | RESERVED |
| ZERO OR CARE-OF ADDRESS | | | | | | | | | |

FIG. 4
BACKGROUND ART

| TYPE | S | B | D | M | G | Rsv | LIFE TIME |
|------|---|---|---|---|---|-----|-----------|
| HOME ADDRESS ||||||||
| HOME AGENT ||||||||
| CARE-OF ADDRESS ||||||||
| IDENTIFICATION ||||||||

EXTENSION ···

FIG. 5
BACKGROUND ART

| TYPE | CODE | LIFE TIME |
|---|---|---|
| HOME ADDRESS | | |
| HOME AGENT | | |
| IDENTIFICATION | | |

EXTENSION · · ·

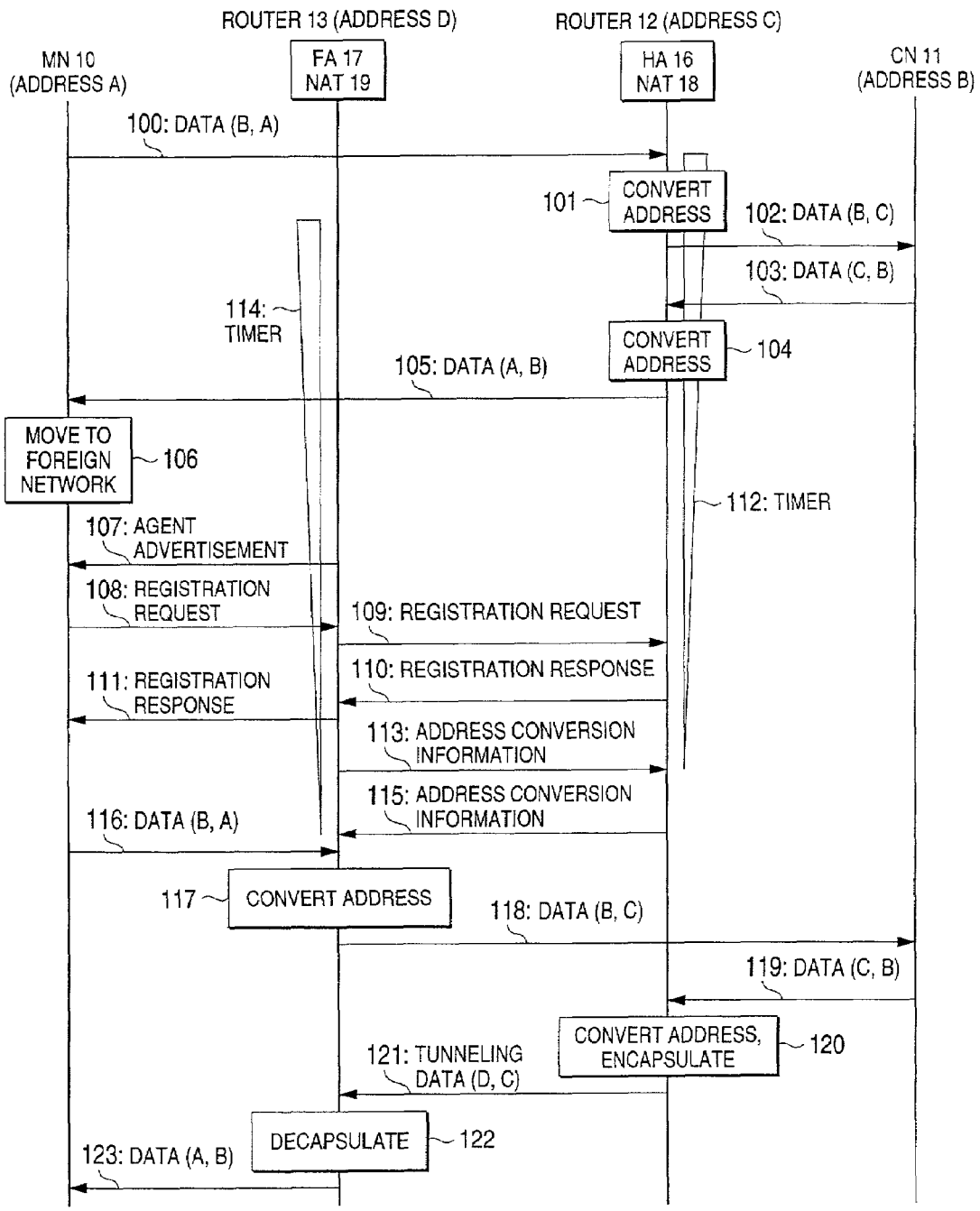

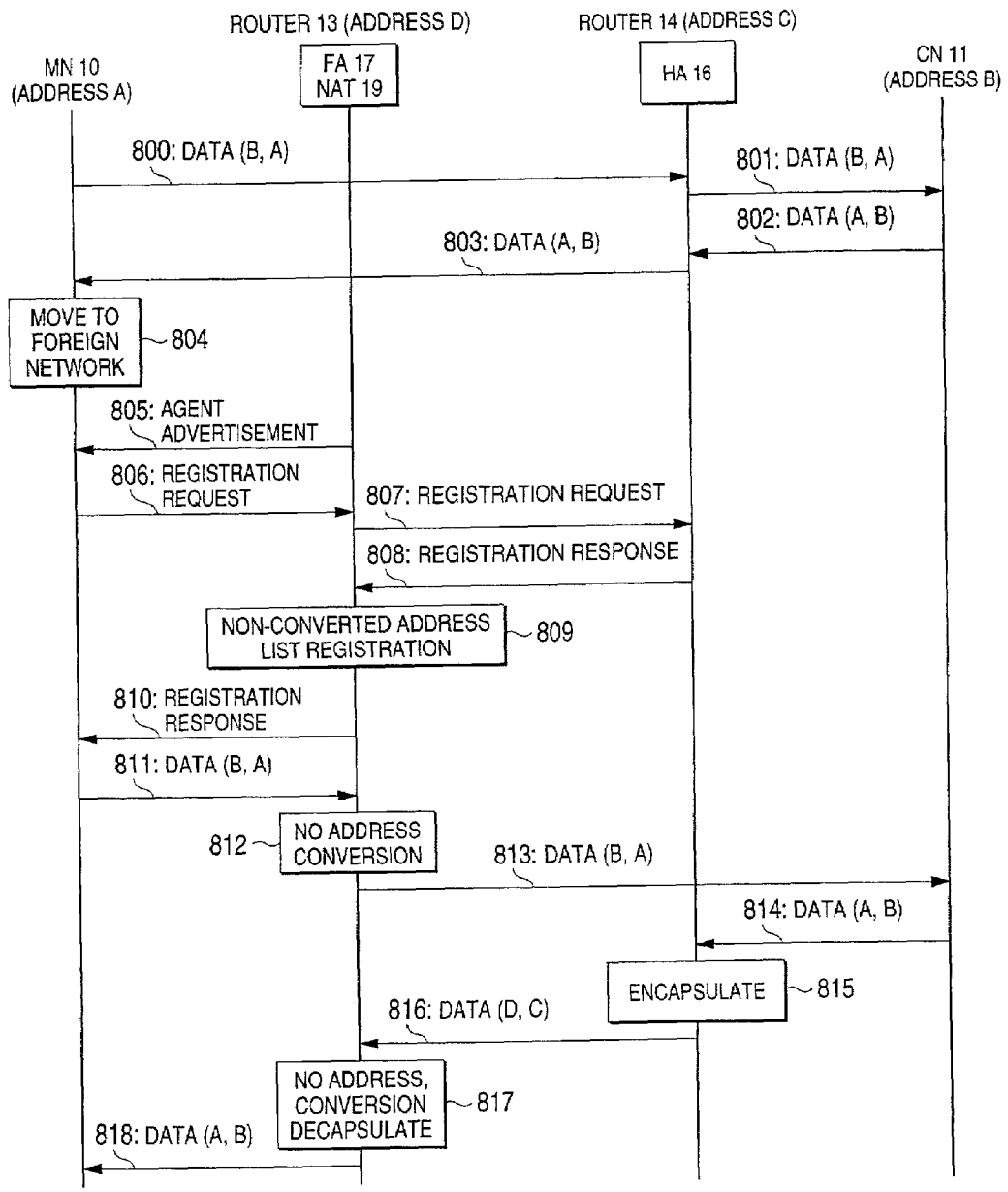

METHOD FOR PACKET COMMUNICATION AND COMPUTER PROGRAM STORED ON COMPUTER READABLE MEDIUM

BACKGROUND OF THE INVENTION

1. Field of the Invention

The present invention relates to a method for packet communication where a node moves between different networks, and particularly to a method for packet communication where a node is moved to networks having a network address translation (NAT) function.

2. Description of the Related Art

In Internet Protocol (IP) communication, a wide area network is divided into a plurality of sub-networks (local area network) for management. Further, each node (node) is assigned an IP address, which includes a network portion indicating a number for identifying a sub-network and a host portion for indicating a reference number of a node in the sub-network.

In IP communication, routing is performed by including the IP address as a sender address and a destination address. For example, a router provided in each sub-network receives a packet existed on an IP network and checks whether a network portion of the destination address matches with a sub-network number managed by itself. If they match, the router incorporates the packet to the its managing sub-network. Each node selects and receives a packet whose destination address matches with its IP address among packets incorporated to the sub-network. It should be noted that the router might be called gateway in software terms.

Due to the above-described configuration of the IP network, a node to which an IP address is assigned within a particular sub-network cannot receive packets addressed to itself when the node is moved to another sub-network. It is because the router managing the sub-network to which the node is moved does not incorporate packets addressed to the node to its managing network.

Thus, in order to solve such a problem, a mobile IP (RFC2002, "IP Mobility Support", RFC: Request For Comment) has been proposed. The mobile IP is proposed by Internet Engineering Task Force (IETF). It is a technology for transferring an IP packet to a node without changing the IP address assigned to the node even when the node is moved across different sub-networks.

FIG. 1 is a construction diagram exemplifying a network concept of the mobile IP. FIG. 1 includes a mobile node(MN) 10, a home network 20 which is sub-network to which the mobile node 10 originally belongs, a home agent unit (HA) 16 for managing movements of the mobile node 10, a router 14 having the HA 16, a foreign network 21 which is a sub-network to which the mobile node 10 moves, a foreign agent unit (FA) 17 for managing the mobile node 10 which is moved into the foreign network 21, a router 15 having the FA 17, a correspondent node (CN) 11 for communicating with the mobile node 10, and an IP network 22 such as Internet connected to the home network 20 and the foreign network 21.

A processing procedure of the mobile IP will be described by using as an example a case where the mobile node 10 is moved to the foreign network 21. An IP address is preset in the mobile node 10 in hardware or software manner. The IP address of the mobile node 10 includes an identification number of the home network 20 as a network portion and includes an identification number of the mobile node 10 in the home network 20 as a host portion.

Now, it is assumed that a packet addressed to the mobile node 10 is sent from the correspondent node 11 onto the IP network 22. The destination address of the packet, that is, the IP address of the mobile node 10 includes the identification number of the home network 20. Thus, the packet is incorporated to the router 14 managing the home network 20 via a path 23. The HA 16 having the router 14 recognizes in advance that the mobile node 10 has been moved to the foreign network 21 and transfers the packet to the router 15 managing the foreign network 21. The FA 17 having the router 15 incorporates the transferred packet to its managing sub-network, that is, the foreign network 21. The mobile node 10 receives the packet incorporated to the foreign network 21 and determines that the destination address matches with its address in order to receive the packet.

It should be noted that a tunneling technology is used for transferring packets from the HA 16 to the FA 17 via path 24. The tunneling technology adds a header including a new destination address and a transferring address to a packet when transferring. The processing that a transferring node adds the header is called encapsulation processing while the processing that a destination node removes the header is called decapsulating processing. In this case where a packet is transferred from the HA 16 to the FA 17, an IP address D, as a transferring address, of the router 15 having the FA 17 and IP address C, as a destination address, of the router 14 having the HA 16 are added as a header.

It will be described a case where the mobile node 10 exists in the foreign network 21 and sends a packet to the correspondent node 11. The mobile node 10 creates a packet including an IP address B of the correspondent node 11 and its IP address (that is, home address A) as the destination and sender addresses, respectively. The created packet is sent to the correspondent node 11 via the path 26, the router 15, and the path 27.

FIG. 2 is a sequence diagram for exemplifying a processing sequence of a mobile IP in a case where the mobile node 10 is moved from the home network 20 to the foreign network 21. In FIG. 2, 1000 to 1002 are processing where the mobile node 10 exists in the home network 20 while 1003 to 1015 are processing where the mobile node 10 exists in the foreign network 21.

First of all, the mobile node 10 in the home network 20 receives an agent advertisement from the router 14 so that it recognizes that a sub-network where it is positioned is managed by the HA 16 of the router 14 (processes 1000 to 1002). FIG. 3 is an explanatory diagram for exemplifying a format of the agent advertisement. As shown, the agent advertisement includes an IP address (Care of Address) of an agent node (that is, a node having the HA and FA) managing the sub-network. It should be noted that the agent advertisement is a packet in which a router discovery of an Internet control message protocol (ICMP) is extended and broadcasted in the sub-network.

Next, the mobile node 10 is moved from the home network 20 into the foreign network 21 (process 1003). In the foreign network 21, the mobile node 10 receives an agent advertisement from the router 15 and recognizes that it is moved into the sub-network managed by the FA 17 of the router 15 (process 1004). Then, the mobile node 10 requests the FA 17 of the router 15 to register its presence (process 1005). More specifically, a message in a format shown in FIG. 4 is sent as a registration request message to the router 15. As shown in FIG. 4, the registration request message includes a home address of the mobile node 10, an address of a home agent managing the mobile node 10 (IP address of the router 14, here), and an address of a foreign agent (Care of address, IP address of the router 15, here).

The FA 17 receives the registration request message shown in FIG. 4 from the mobile node 10 and registers (stores) its content. Then, the FA 17 transfers the registration request message to the HA 16 (process 1006). The HA 16 receives the registration request message and registers (stores) its registration content so that packet communication can be performed in the foreign network 21 as well. Further, the HA 16 responds to the FA 17 that registration has been completed (process 1007). More specifically, the FA 17 sends a message in a format shown in FIG. 5 as a response message to the router 15. As shown in FIG. 5, the message includes a home address of the mobile node 10 and an IP address of the home agent (IP address of the router 14, here) FA 17 receives the response message and sends the response message to the mobile node 10. The mobile node 10 receives the response message so that it can recognizes that communication is possible (process 1008).

Next, a method for communication between the mobile node 10 and the correspondent node 11 will be described with reference to FIGS. 1 and 2. The mobile node 10 creates packet data whose destination address is an IP address B of the correspondent node 11 and whose sender address is its IP address A. Then, the mobile node 10 sends the packet into the foreign network 21 (process 1009). The packet is sent to the correspondent node 11 on the IP network 22 through the router 15 (process 1010). When the correspondent node 11 responds to the received packet, that is, when the correspondent node 11 responds to the mobile node 10, the correspondent node 11 sends to the IP address B a packet whose destination address is the address A which is a destination address of the received packet and whose sender address is its IP address B (process 1011).

The packet sent in this manner includes an identification number of the home network 20 in the network portion of its destination address A. Thus, it is incorporated to the router 14 once. The home agent 16 of the router 14 has already realized that the mobile node 10 was moved to the foreign network 21. The home agent 16 encapsulates the received packet and tunneling-transfers it to the router 15 (processes 1012 and 1213). More specifically, the home agent 16 adds to the packet a new packet whose destination address is an IP address D of the router 15 and whose sender address is an IP address C of the router 14 and sends out the packet to the IP network 22. The router 15 receives the tunnel-transferred and encapsulated packet and decapsulates the packet (process 1014). It should be noted that the destination and sender addresses of the packet resulted from the decapsulation are the same as those before encapsulation, and they are the IP address A of the mobile node 10 and the IP address B of the correspondent node 11, respectively. The decapsulated packet are sent from the router 15 into the foreign network 21 and received by the mobile node 10 (process 1015). In this way, the communication is possible between the mobile node 10 in the foreign network 21 and the correspondent node 11 on the IP network.

Recently, since IP address resources must be used efficiently, a private network has been established which uses technologies including private addresses, NAT, and IP masquerades in enterprises.

It should be noted that when an address used within a particular network is a global address, a private address is an address used only in a particular sub-network belonging to the global network. Further, NAT translates a destination address and a sender address of each packet from a private address to a global address, or from a global address to a private address when packet communication is performed between node using the private address and node using the global address. In NAT, the private address and the global address are mapped one-to-one.

The IP masquerade is resulted from the extension of the NAT. The IP masquerade is a technology for mapping a plurality of private addresses to one global address by regarding one including a port number of TCP (transmission control) and/or UDP (user datagram protocol) as an address. A network using a private address and a network using a global address are called a private network and a global network, respectively, below.

SUMMARY OF THE INVENTION

It is an object of the present invention to provide a method for communication which can be applied to a case where such a private network is included in networks where a node is moved.

In order to achieve the object, the present invention changes a sender address of a packet sent by a node to a same global address when the node, which can be moved among different networks and sends a packet including a private address as a sender address, sends the packet in either one of the networks.

According to the construction, a sender address of a packet received in a correspondent node does not change before and after the movement of the node. Therefore, it reduces interruptions of communication due to that the correspondent node determines a packet from a same node as a packet from a different node.

BRIEF DESCRIPTION OF THE DRAWINGS

FIG. 3 is a diagram for exemplifying a format for an agent advertisement message used in the mobile IP;

FIG. 4 is a diagram for exemplifying a format for a registration request message used in the mobile IP;

FIG. 5 is a diagram for exemplifying a format for a registration response message used in the mobile IP;

FIG. 7 is a diagram for exemplifying a communication sequence if registration and data transfer according to the first embodiment of the present invention;

FIG. 8 is a diagram for exemplifying address translation information according to the first embodiment of the present invention;

FIG. 19 is a diagram for exemplifying a communication sequence according to the eighth embodiment of the present invention; and FIG. 20 is a diagram for exemplifying an address translation list according to the eighth embodiment of the present invention.

DETAILED DESCRIPTION OF THE PREFERRED EMBODIMENTS

When a mobile node is moved from a private network to a private network, from a private network to a global network, or from a global network to a private network, communication may be interrupted due to some setting in a correspondent node.

For example, in a case where a mobile node is moved from a private network to a private network, that is, where both home network and foreign network are private networks, and when the mobile node exists in the home network, address translation is performed by a NAT in the home network. When the mobile node is moved to the foreign network, the address translation is performed by another NAT in the foreign network. So, an IP address resulted from the translation by the NAT in the home network and an IP address resulted from the translation by the NAT in the foreign network are not translated into the same address.

Therefore, when the IP address resulted from the translation by the NAT in the private network the mobile node is moved from and the IP address resulted from the translation by the NAT in the private network the mobile node is moved to are different, the correspondent node determines those packets as packets from different mobile nodes, which causes interruption of communication.

Thus, according to the present invention, the communication is performed in a following manner.

First Embodiment

Figure 1:
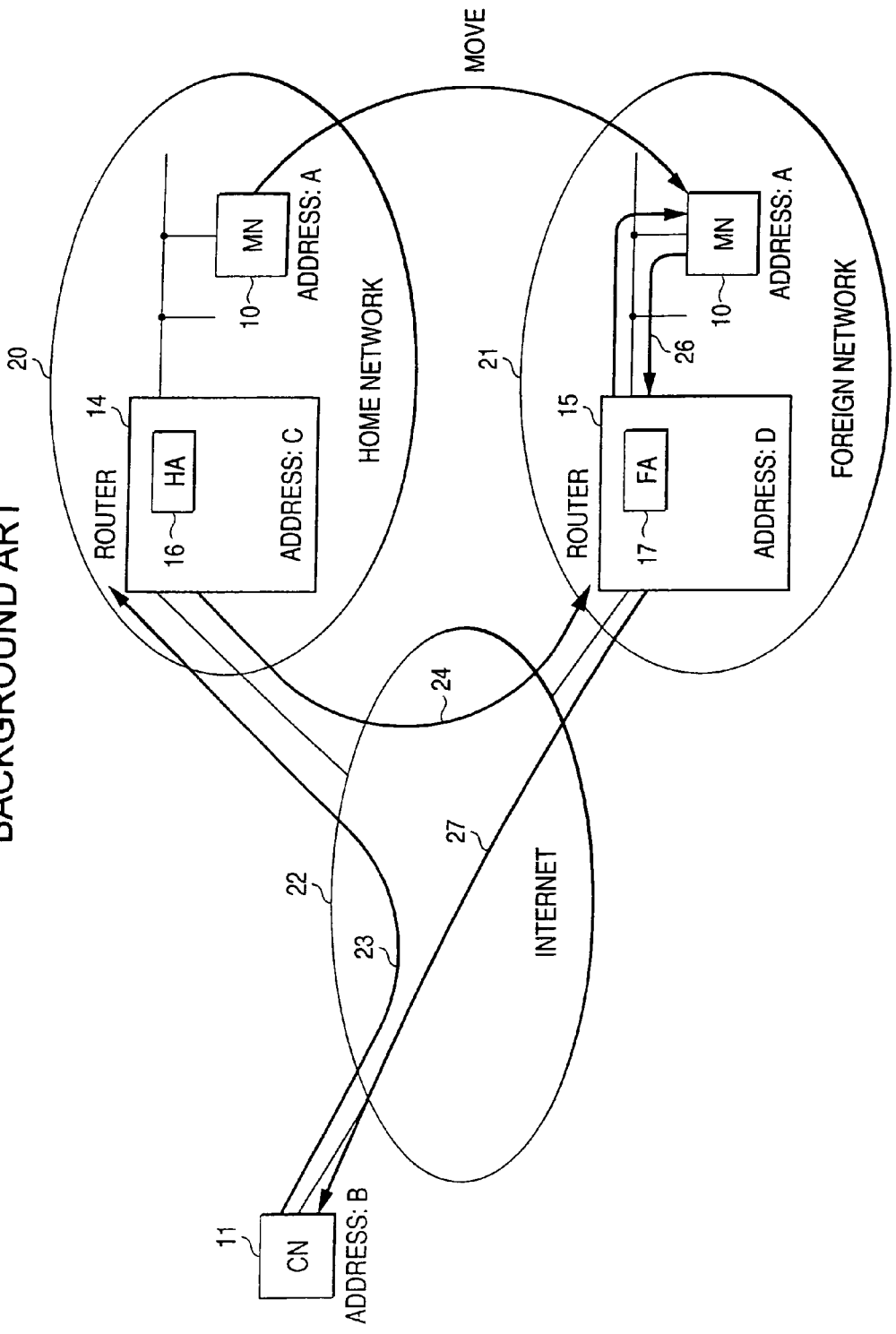
FIG. 1 is a configuration diagram for exemplifying a communication system for a mobile IP.
Figure 2:
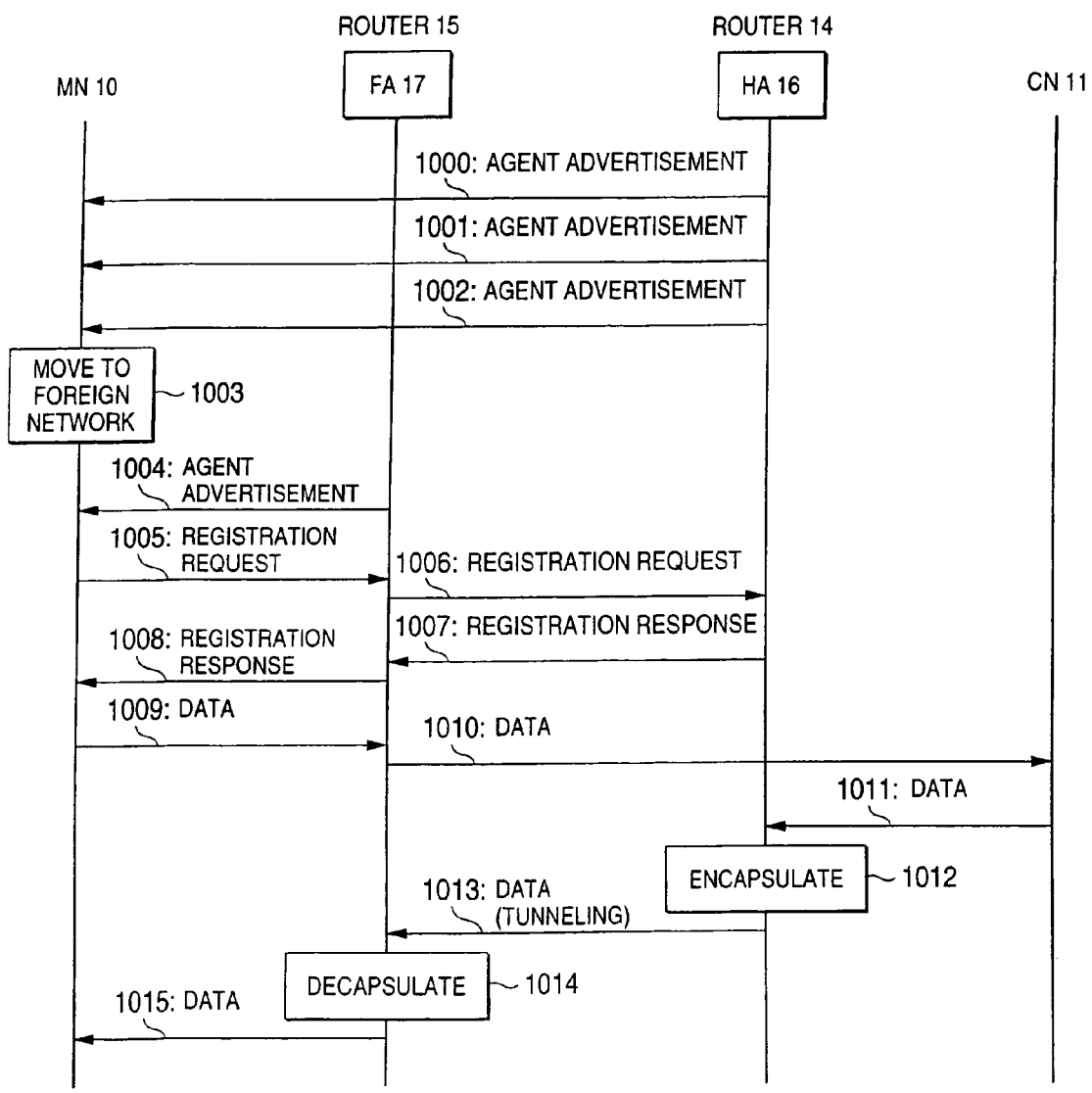
FIG. 2 is a diagram for exemplifying a communication sequence of the mobile IP.
Figure 6:
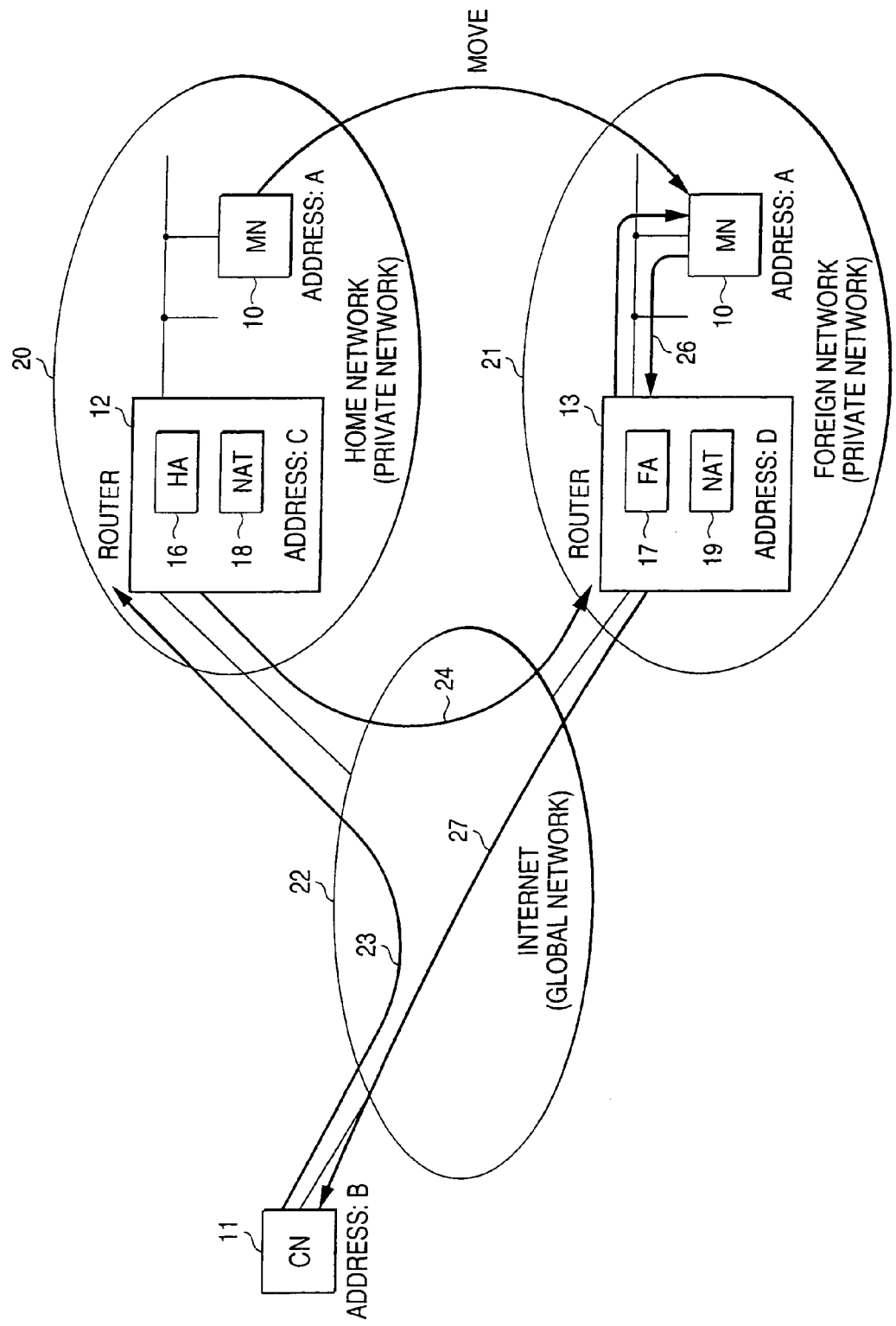
FIG. 6 is a configuration diagram for exemplifying a communication system according to a first embodiment of the present invention.

A method for packet communication according to the present invention will be described below with reference to figures. FIG. 6 is an explanatory diagram for exemplifying a network construction and its packet transfer path according to a first embodiment of the present invention. In FIG. 6, identical reference numerals will be given to identical or corresponding parts, and their description will be omitted here. In FIG. 6, both home network 20 and foreign network 21 are private networks using private addresses. A router 12 has functions of HA 16 and a NAT 18 and connects an IP network 22 and a home network 20. A router 13 has functions of the FA 17 and the NAT 19 and connects the IP network 22 and the foreign network 21. Assigned to a home address of the mobile node 10, the correspondent node 11, the router 12, and the router 13 are a private address A, a global address B, a global address C, and a global address D. While a case where the NAT 18 assigns the global address C of the router 12 itself to the mobile node 10, another global address may be assigned to the mobile node 10.

As described above, the NAT maps a particular global address to a private address of a node. Such a mapping relationship will be referred to address translation information below. FIG. 8 is an explanatory diagram for exemplifying address translation information for the NAT 18. FIG. 8 includes a private address 28 which is assigned to the mobile node 10 as a home address, and a global address 29 which is assigned as a translated address of the home address. Here, a global address C is mapped to a private address A. That is, the NAT 18 translates a sender address of a packet sent from the mobile node 10 from the private address A to the global address C. Further, the NAT 18 translates a destination address of a packet sent from the correspondent node 11 from the global address C to the private address A.

The first embodiment is characterized in that the NAT 19 of the foreign network 21 has identical address translation information to that of the NAT 18 in the home network 20 with respect to the mobile node 10. More specifically, the NAT 18 and the NAT 19 communicates each address translation information with each other periodically so that the identical global address are mapped for the mobile node 10. Thus, like the NAT 18, the NAT 19 translates a sender address of a packet sent from the mobile node 10 from the private address A to the global address c in order to send it to the correspondent node 11. Therefore, sender addresses of the packets sent from the home network 20 and the foreign network 21, respectively, can be matched, which can improve interruption of communication due to changes in sender addresses during communication.

Figure 9:
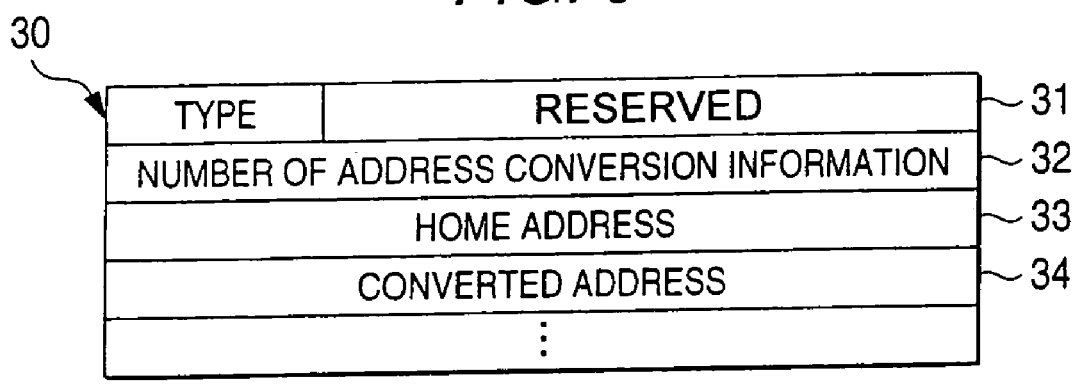
FIG. 9 is a diagram for exemplifying a format for a message notifying address translation information according to a first embodiment of the present invention.

A packet in a format shown in FIG. 9 is used for notifying address translation information. FIG. 9 shows message type 30, which indicates that it is a message for notifying address translation information here. Further, FIG. 9 shows an unused reserved area 31, a number of address translation information to be notified, a home address 33 (for example, provide address A) of the mobile node 10, and a global address 34 (for example, global address C) mapped to the home address of the mobile node 10. The home address 33 and the global address 34 make a pair, and a number of this pair is used as the number of the address translation information 32.

FIG. 7 is an explanatory diagram for exemplifying a sequence in a case where the mobile node 10 is moved from the home network 20 to the foreign network 21 during communication with the correspondent node 11 according to the network construction shown in FIG. 6. FIG. 7 includes processes 100 to 105 in a case where the mobile node 10 exists in the home network 20, and processes 107 to 123 in a case where the mobile node 10 exists in the foreign network 21. In the process 100 in FIG. 7, the mobile node 10 in the home network 20 sends packet data to the router 12 so that it can send data to the correspondent node 11 (process 100). A destination address of the packet is the global address B of the correspondent node 11, while its sender address is the private address A of the mobile node 10. It should be noted that packets having the destination address B and the sender address A are referred to Data (B, A) in FIG. 7. The other packets are similarly referred to Data (destination address, sender address).

The router 12 receives the packet from the mobile node 10. Then, the router 12 uses the NAT 18 to translate the sender address of the packet from the private address A to the global address C of the router 12 (process 101). The packet whose address has been translated is sent onto the IP network 22 and received by the correspondent node 11 (process 102). The correspondent node 11 sends the packet to the sender address of the packet received in the above-described process 102 in order to return the packet to the mobile node 10 (process 103). That is, the correspondent node 11 sends onto the IP network 22 the packet whose destination address is the global address C of the router 12 and whose sender address is the global address B of the correspondent node 11.

The router 12 receives the packet returned from the correspondent node 11. Then, the router 12 uses the NAT 18 to translate the destination address of the packet from the global address C of the router 12 to the private address A of the mobile node 10 (process 104). The packet having translated address is sent onto the home network 20 and received by the mobile node 10 (process 105). This way allows data exchanges between the mobile node 10 in the home network 20 and the correspondent node 11 on the IP network.

Next, it will be described a case where the mobile node 10 is moved from the home network 20 to the foreign network 21 during communication as described above. In the process 106 in FIG. 7, the mobile node 10 is moved from the home network 20 to the foreign network 21 (process 106). The mobile node 10 receives an agent advertisement in the foreign network 21 so that the mobile node 10 can detect that it is moved to the foreign network 21 (process 107). As described with reference to FIG. 3, the agent advertisement includes an IP address of the FA 17 (IP address D of the router 13, here).

The mobile node 10 having detected the movement requests registration to the FA 17 by using a format shown in FIG. 4 as described above. The FA 17 receives the registration request and notices that the mobile node 10 has been moved into the foreign network 21 (process 108). Further, the FA 17 transfers the registration request to the HA 16 (process 109). The HA 16 receives the registration request from the FA 17 and notices that the mobile node 10 has been moved to the foreign network 21. Then, the HA 16 returns a registration response in a format shown in FIG. 5 described above to the FA 17 (process 110). Further, the registration response is returned from the FA 17 to the mobile node 10 so that the registration will be completed (process 111).

After the registration process as described above, the NAT 18 and the NAT 19 notify address translation information regarding the mobile node 10 to each other periodically. It will be described in detail. The NAT 18 has a timer, which times out periodically (process 112). Corresponding to the time-out, address translation information is notified from the NAT 18 to the NAT 19 in a format shown in FIG. 9 described above (process 113). Thus, the NAT 19 notices that the home address A of a packet of the mobile node 10 is translated to the global address C in the home network 20. Similarly, when a timer provided in the NAT 19 times out (process 114), address translation information is notified from the NAT 19 to the NAT 18 (process 115).

Next, a case will be described where data is sent from the mobile node 10 in the foreign network 21 to the correspondent node 11. The mobile node 10 in the foreign network sends a packet to the router 13 in order to send data to the correspondent node 11 (process 116). A destination address and sender address of the to-be-sent packet are the global address B of the correspondent node 11 and the private address A of the mobile node 10, respectively. The NAT 19 of the router 13 having received the packet from the mobile node 10 uses address translation information received in process 113 to translate a sender address of the packet from the private address A to the global address C (process 117). The destination address and the sender address of the packet whose address is translated in this manner are both global addresses. Therefore, the packet can be sent onto the IP network and transmitted to the correspondent node 11 (process 118).

The correspondent node 11 having received the packet send the packet whose destination address is the global address C which is the sender address of the earlier received packet in order to return the packet to the mobile node 10 (process 119). The router having received the packet from the correspondent node 11 translates the destination address of the packet from the global address C to the private address A in the NAT 18 (process 120). Further, HA 16 adds a new header to the packet so that the destination address and the sender address become the global address D of the router 13 and the global address C of the router 12, respectively (that is, IP-encapsulated). The encapsulated packet is translated, that is, tunneled to the FA 17 of the router 13 (process 121). The FA 17 of the router 13 having received the tunneled packet decapsulates the packet (process 122) and sends it to the mobile node 10 (process 123). This allows communication between the mobile node 10 in the foreign network 21 and the correspondent node 11 on the IP network.

As described above, according to the first embodiment, even when a mobile node to which a private address is assigned is moved between different sub-networks, interruption of communication due to changes in a sender address during communication can be improved since mapping between a private address and a global address with respect to the mobile node in a foreign network is the same as mapping in a home network.

Second Embodiment

Figure 10:
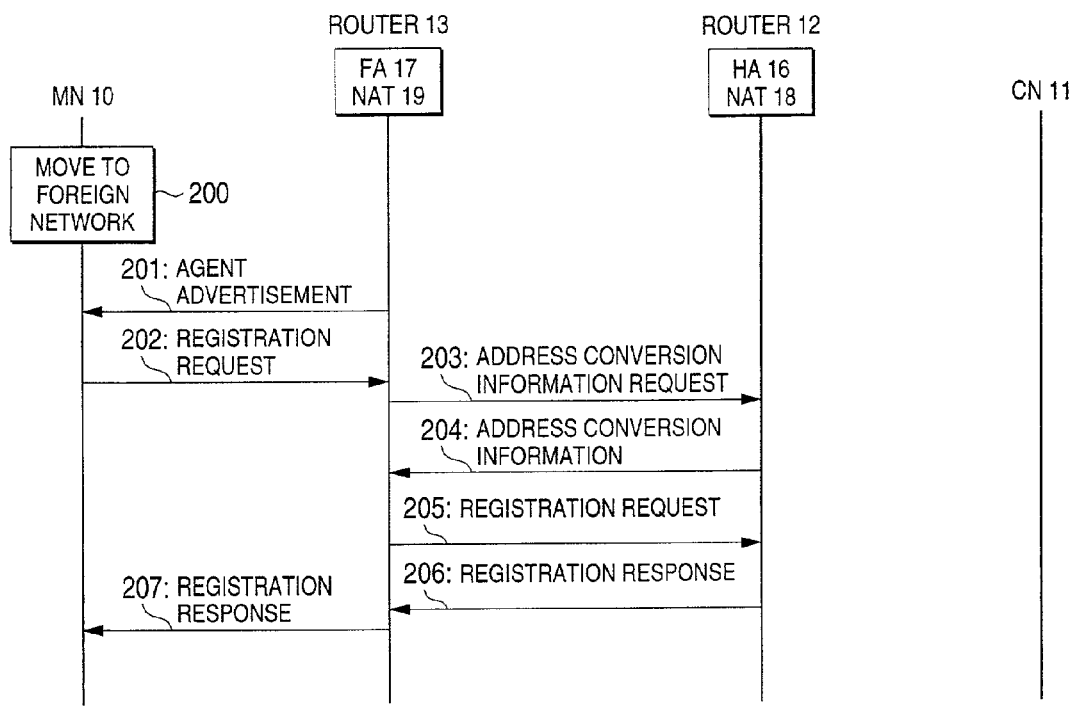
FIG. 10 is a diagram for exemplifying a communication sequence according to a second embodiment of the present invention.

In the first embodiment, as shown in he processes 112 to 115 in FIG. 7, address translation information is sent by using time-out of a timer as a trigger. In a second embodiment, a registration request to be sent from be mobile node 10 to the router 13 is used as a trigger in order to send a request message for address translation information from the NAT 19 to the NAT 18. FIG. 10 is an explanatory diagram for exemplifying a sequence where, in a network construction shown in FIG. 6, a registration request from the mobile node 10 is used as a trigger so that the NAT 19 of the router 13 obtains address translation information from the NAT 18 of the router 12. FIG. 10 includes each of processes 200 to 207.

Figure 11:
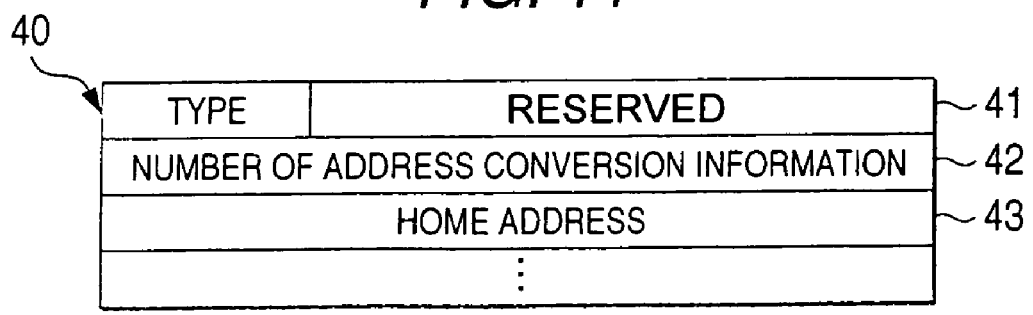
FIG. 11 is a diagram for exemplifying a format for a message requesting address translation information according to the second embodiment of the present invention.

In process 200 in FIG. 10, the mobile node 10 in moved from the home network 20 to the foreign network 21 (process 200). The mobile node 10 receives an agent advertisement so that it detects that it has been moved to the foreign network 21 (process 201). The mobile node 10 having detected the movement uses a format shown in FIG. 4 in order to request a registration to the FA 17 (process 202). The receipt of the translation request is used as a trigger, and the NAT 19 of the router 13 requests address translation information regarding the mobile node 10 to the NAT 18 of the router 12 (process 203). FIG. 11 is an explanatory diagram for exemplifying a format of a message sent to the NAT 18 as the address translation information request. 40 indicates a message type, which includes a code indicating that it is a message for requesting address translation information here. 41 indicates that a reserved area is unused, and 42 indicates a number of address translation information to be requested. 43 indicates a home address of the mobile node 10.

The NAT 18 having received the address translation information request in the process 203 returns address translation information regarding the mobile node 10 to the NAT 19 (process 204). That is, a global address mapped to the home address of the mobile node 10 (a private address here) is sent to the NAT 19 by using a format shown in FIG. 9. Next, a registration is requested from the FA 17 to the HA 16 (process 205) and a response indicating that a registration has been done, that is a registration response is returned from the HA 16 to the FA 17 (process 206). Further, the registration response is returned from the FA 17 to the mobile node 10 (process 207).

In the manner as described above, the mobile node 10 is registered to the HA 16 and the FA 17, and address translation information of the mobile node 10 is set in the NAT 19. Thus, a sender address of a packet sent from the mobile node 10 is translated to a global address, which is identical to that of the NAT 18 of the router 12, in the NAT 19 of the router 13.

Third Embodiment

Figure 12:
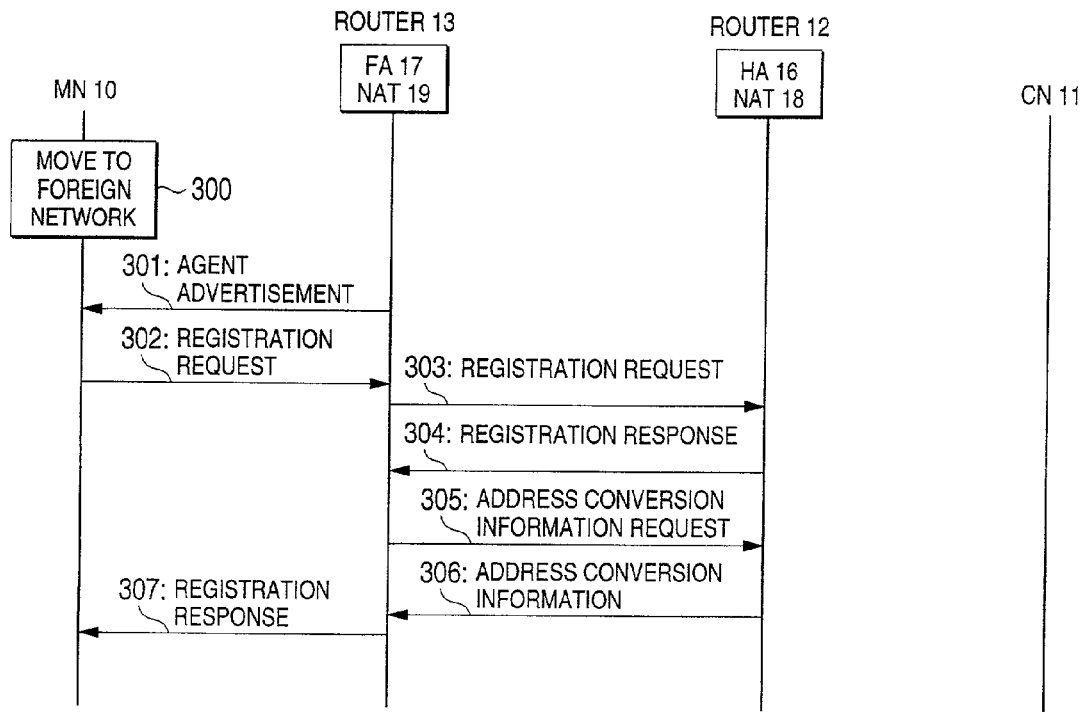
FIG. 12 is a diagram for exemplifying a communication sequence according to a third embodiment of the present invention.

In the second embodiment, a registration request sent from the mobile node 10 to the router 13 is used as a trigger in order to request address translation information. In a third embodiment, a registration response sent from the NAT 18 to the NAT 19 is used as a trigger in order to request address translation information from the NAT 19 to the NAT 18. FIG. 12 is an explanatory diagram for exemplifying a sequence where, in a network construction shown in FIG. 6, a registration response from the HA 16 is used as a trigger so that the NAT 19 of the router 13 obtains address translation information from the NAT 18 of the router 12. FIG. 12 includes each of processes 300 to 307. In process 300 in FIG. 12, the mobile node 10 is moved from the home network 20 to the foreign network 21 (process 300). The mobile node 10 receives an agent advertisement so that it detects that it has been moved to the foreign network 21 (process 301). The mobile node 10 having detected the movement uses a format shown in FIG. 4 in order to request a registration to the FA 17 (process 302). The FA 17 having received the registration request requests a translation further to the HA 16 after the registration(process 303). The HA 16 having received the registration request from the FA 17 returns a response indicating that it has registered, that is, a registration response to the FA 17 after the registration (process 304).

When the router 13 receives the registration response in the process 304 from the HA 16, it requests address translation information to the NAT 18 of the router 12 by using the receipt of the registration response as a trigger (process 305). More specifically, a message requesting address translation information regarding the mobile node 10 is sent by using a format shown in FIG. 11. The NAT 18 having received the request message returns the address translation information by using a format shown in FIG. 9 to the NAT 19 (process 306). The NAT 19 of the router 13 receives the address translation information and then returns a translation response to the mobile node 10 (process 307).

As described above, address translation information is requested after an HA (home agent) returns a translation response, which eliminates a need for address translation information requests when a registration is failed. In this case, an unnecessary message does not have to be sent to a network.

Fourth Embodiment

Figure 13:
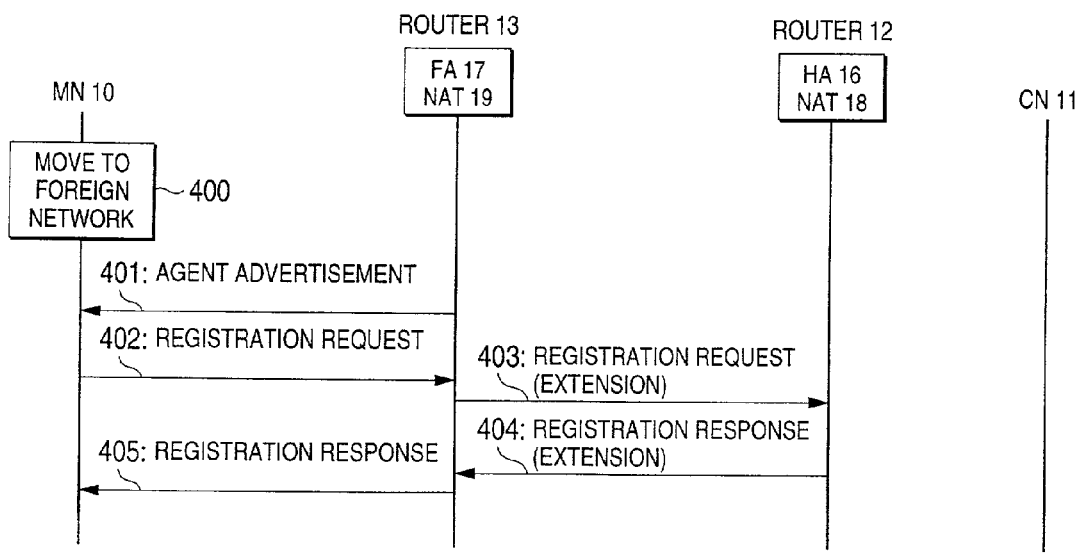
FIG. 13 is a diagram for exemplifying a communication sequence according to a fourth embodiment of the present invention.

In a fourth embodiment, the address translation information request shown in FIG. 11 is added into a message of the registration request and the registration response in the processes 109 and 110 shown in FIG. 7. FIG. 13 is an explanatory diagram for exemplifying a sequence where, in a network construction shown in FIG. 6, an address translation information request is added into a translation request message and address translation information is added into a translation response message so that the NAT 10 of the router 13 obtains address translation information from the NAT 18 of the router 12.

In a process 400 in FIG. 13, the mobile node 10 is moved from the home network 20 to the foreign network 21 (process 400). The mobile node 10 receives an agent advertisement so that it detects that it has moved to the foreign network 21 (process 401). The mobile node 10 having detected the movement requests a registration to the FA 17 by using the format shown in FIG. 4 (process 402). The FA 17 having received the translation request requests an extended registration to the HA 16 after translation. More specifically, the FA 17 sends an extended registration request message, which is made by adding a number of address translation information requests 42 and a home address 43 shown in FIG. 11 to the format shown in FIG. 4 (process 403).

The HA 16 having received the extended registration request in the process 403 returns an extended registration response to the HA 17. More specifically, the HA 16 returns an extended registration response message, which is made by adding a number of address translation information 32, a home address 33, and a translation address 34 shown in FIG. 9 to the format shown in FIG. 5 (process 404). The NAT 19 receives the extended registration response so that it can obtain address translation information regarding the mobile node 10. Then, a registration response is returned from the FA 17 to the mobile node 10 so that the registration is completed (process 405).

As described above, an address translation information request message is added to a registration request message for transmission. Thus, it can reduces a number of message sent and time required from the registration request to a completion of obtaining address translation information.

Fifth Embodiment

Figure 14:
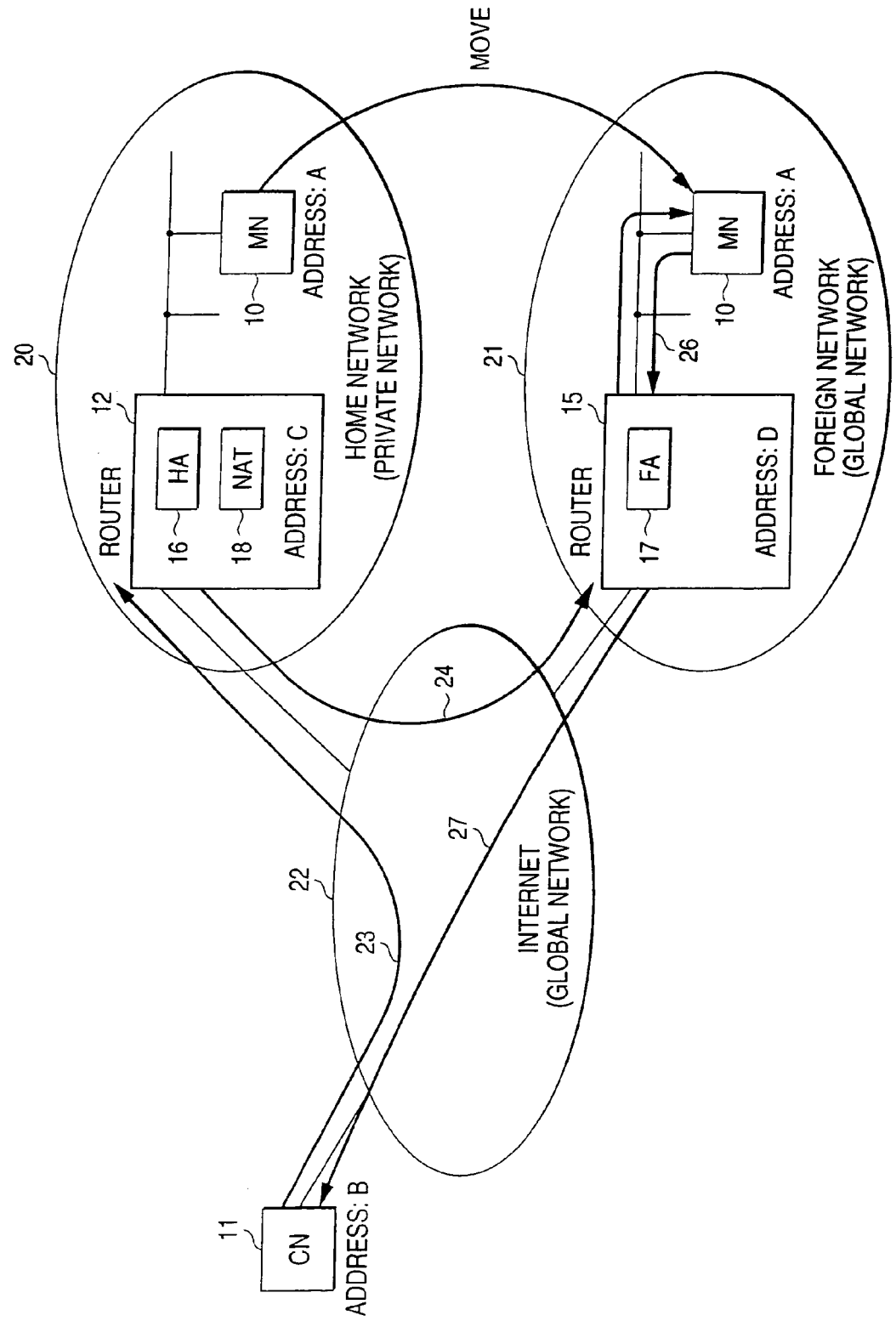
FIG. 14 is a construction diagram for exemplifying a communication system according to a fifth embodiment of the present invention.

In the first embodiment, both home network 20 and foreign network 21 have NATs. In a fifth embodiment, the foreign network 21 does not have a NAT. It will be described a case where the FA 17 performs address translation with respect the mobile node 10. FIG. 14 is an explanatory diagram for exemplifying a network construction and its packet transfer path according to the fifth embodiment. In FIG. 14, identical reference numerals will be given to identical or corresponding parts in FIG. 6, and their description will be omitted here.

In FIG. 14, the foreign network 21 is a global network using a global address. The router 15 connects an IP network 22 and a foreign network 21. Further, the home network 20 is a private network using a private address. The router 12 connects the IP network 22 and the home network 20. The router 15 has functions of the FA 17 but not NAT functions. The router 12 has functions of the HA 16 and the NAT 18. A private address A, a global address B, a global address C, and a global address D are assigned to a home address of the mobile node 10, the correspondent node 11, the router 12, and the router 15, respectively.

Figure 15:
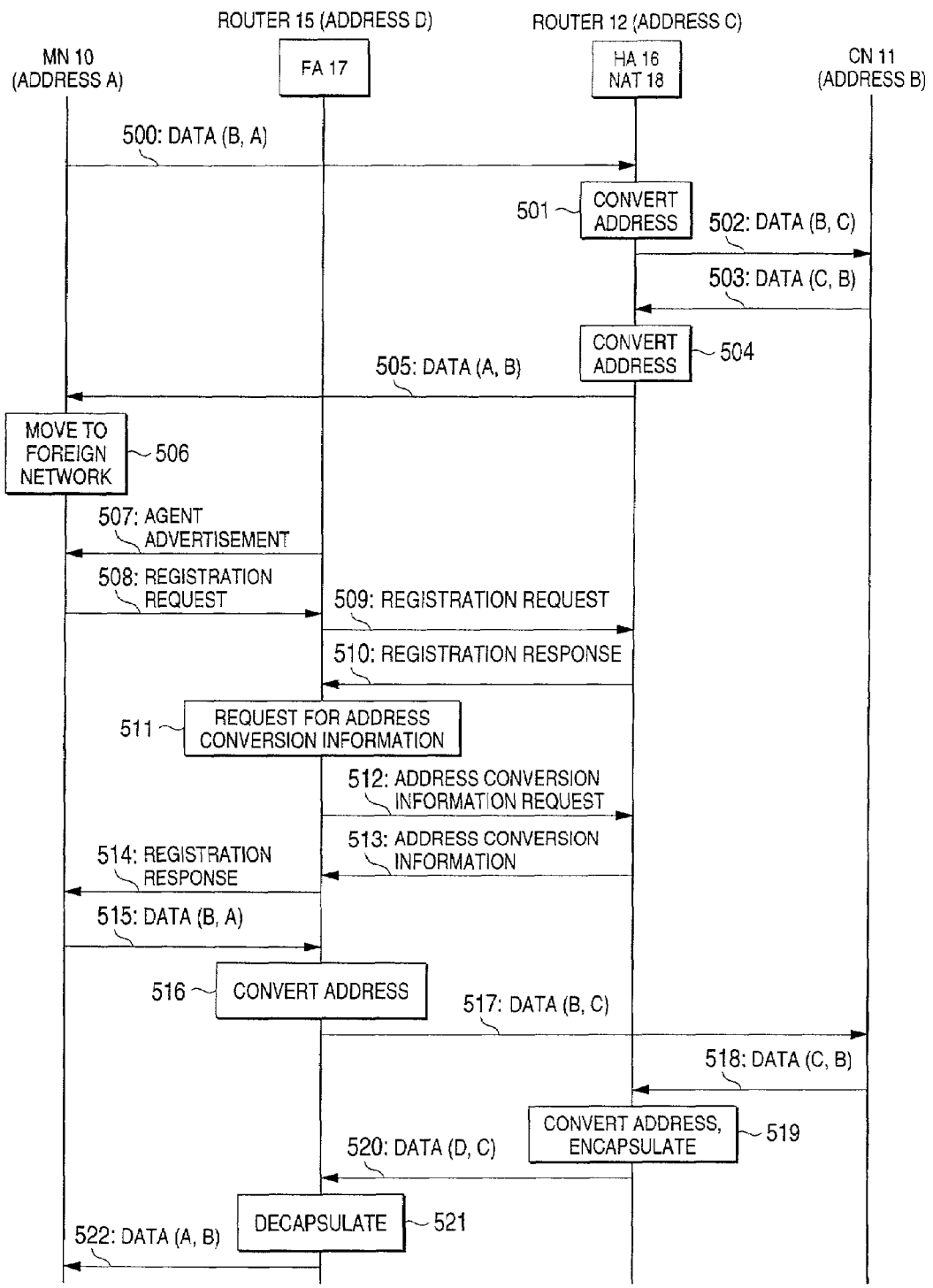
FIG. 15 is a diagram for exemplifying a communication sequence according to the fifth embodiment of the present invention.

FIG. 15 is an explanatory diagram for exemplifying a sequence where, in a network construction shown in FIG. 14, the mobile node 10 is moved from the home network 20 to the foreign network 21 during communication with the correspondent node 11. In FIG. 15, 500 to 522 indicate processes, respectively. In the process 500 in FIG. 15, the mobile node 10 in the home network 20 sends a packet to the router 12 in order to send data to the correspondent node 11 (process 500). A destination address of the packet is a global address B while its sender address is a private address A.

The router 12 having received the packet from the mobile node 10 uses the NAT 18 to translate the sender address of the received packet from the private address to the global address C of the router 13 (process 501). Then, the packet whose address is translated is sent to the correspondent node 11 (process 502). The correspondent node 11 receives the packet and returns the packet whose destination address is the address C of the router 12 and whose sender address is the address B of the correspondent node 11 (process 503). The router 12 having received the returned packet from the correspondent node 11 uses the NAT 18 to translate the destination address of the returned packet from the address C to the address A of the mobile node 10 (process 504). The packet whose address has been translated is sent to the mobile node 10 (process 505). In this way, communication is performed between the mobile node 10 in the home network 20 and the correspondent node 11 on the IP network.

Further, during communication as above, the mobile node 10 is moved from the home network 20 to the foreign network 21 (process 506). The mobile node 10 receives an agent advertisement in the foreign network 21 so that it detects that it has moved to the foreign network 21 (process 507). The mobile node 10 having detected the movement request a registration to the FA 17 by using the format shown in FIG. 4 (process 508). Further, a registration request is performed from the FA 17 to the HA 16 (process 509), and a registration response is returned from the HA 16 to the FA 17 (process 510). As shown in FIG. 5, The registration response includes a home address of the mobile node 10.

Here, the home address of the mobile node 10 is a private address. Thus, The FA 17 having received the registration response in the process 510 determines that address translation information regarding the mobile node 10 is required (process 511). Then, the FA 17 sends a message requesting for address translation information regarding the mobile node 10 to the NAT 18 by using the format shown in FIG. 11 (process 512). The NAT 18 returns address translation information of the mobile node 10 in the format shown in FIG. 9 to the FA 17 as a response to the request message in the process 512 (process 513). The FA 17 receives the response and then sends a registration response to the mobile node 10 (process 514). Thus, a registration is completed, and address translation information of the mobile node 10 is set in the FA 17.

Next, a case will be described where data is sent from the mobile node 10 in the foreign network 21 to the correspondent node 11. The mobile node 11 in the foreign network 21 sends a packet to the router 15 in order to send data to the correspondent node 11 (process 515). A destination address of the packet is a global address B while its sender address is a private address A. The router 15 having received the packet from the mobile node 10 translates through the FA 17 the sender address of the received packet from the private address A to the global address C based on address translation information obtained in the above-described process 513 (process 516). The packet whose address has been translated is sent to the correspondent node 11 (process 517).

The correspondent node 11 receives the packet and then sends as a returned packet to the mobile node 10 the packet whose destination address is an address C which is a sender address of the received packet (process 518). The NAT 18 of the router 12 translate the destination address of the returned packet from the correspondent node 11 from the address C of the router 12 to the address A of the mobile node 10. Further, through the HA 16, the NAT 18 sets the destination address and the sender address to the address D of the router 15 and the address C of the router 12 for IP-encapsulation (process 519). The IP-encapsulated packet is tunneled to the FA 17 of the router 15 (process 520). The FA 17 of the router 15 decapsulates the tunneled packet (process 521). The packet resulted from the decapsulation is sent to the mobile node 10 (process 522). In this way, communication becomes possible between the mobile node 10 in the foreign network 21 and the correspondent node 11 on the IP network.

As described above, when an NAT does not exist in a foreign network, an FA (foreign agent) performs address translation for a packet received/sent by a mobile node. Thus, the mobile node can continue communication even in the foreign network. That is, even when a home network is a private network and a foreign network to which it is moved is a global network, communication can be continued.

Sixth Embodiment

Figure 16:
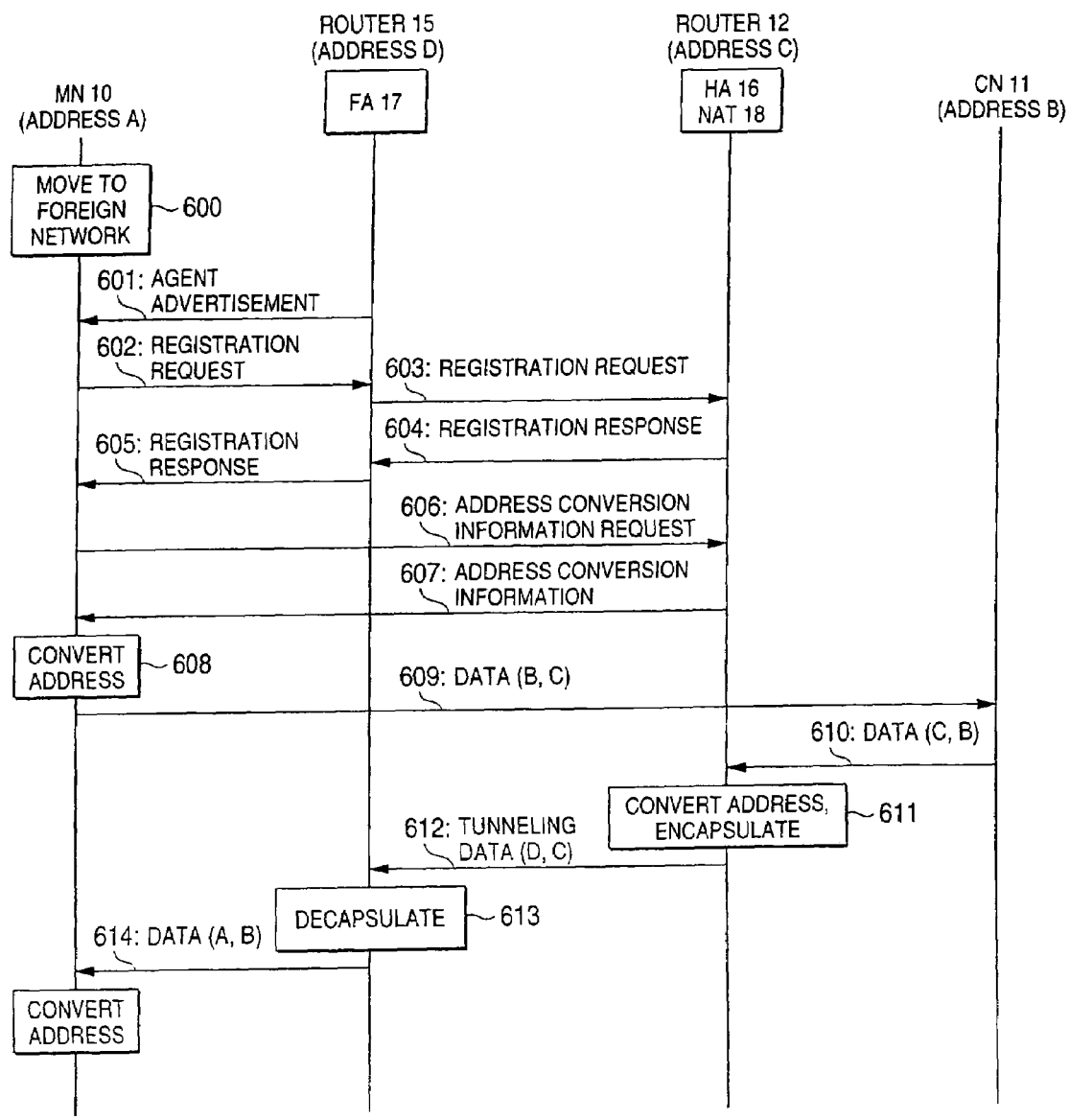
FIG. 16 is a diagram for exemplifying a communication sequence according to a sixth embodiment of the present invention.

In the fifth embodiment, the FA 17 performs address translation with respect to the mobile node 10. In a sixth embodiment, the mobile node 10 itself performs address translation. Further, the mobile node 10 uses a registration response sent from the FA 17 as a trigger to obtain address translation information. FIG. 16 shows in the network construction shown in FIG. 14 a sequence where the mobile node 10 itself uses a registration response as a trigger to obtain address translation information from the NAT 18 of the router 12.

In a process 600 in FIG. 16, the mobile node 10 is moved from the home network 20 to the foreign network 21 (process 600). The mobile node 10 receives an agent advertisement so that it detects that it has moved to the foreign network 21 (process 601). The mobile node 10 having detected its movement uses the format shown in FIG. 3 to request a registration to FA 17 (process 602). After the registration, the FA 17 further requests a registration to the HA 16 (process 603). After the registration, the HA 16 returns a registration response to the FA 17 (process 604). The FA 17 receives the registration response and sends the registration response further to the mobile node 10 (process 605). In this way, the registration is completed.

The mobile node 10 having received the registration response from the FA 17 uses it as a trigger in order to send a message requesting its address translation information to the NAT 18 by using the format shown in FIG. 11 (process 606). The NAT 18 sends address translation information of the mobile node 10 to the mobile node 10 by using the format shown in FIG. 9 as a response to the request message (process 607). The mobile node 10 receives the response and notices its address translation information.

Next, it will be described a case where data is sent from the mobile node 10 in the foreign network 21 to the correspondent node 11. In process 608, the mobile node 10 creates packet data to be sent to the correspondent node 11. A sender address of the created packet is not the private address A of the mobile node 10 but is set to the global address C which is mapped to the private address A. The created packet is sent, and then it is received by the correspondent node 11 (process 609). The correspondent node 11 sends a packet by using the address C which is a sender address of the received packet for its destination address as a response to the received packet (process 610). The packet whose destination address is the address C is received by the router 12. The router 12 uses the NAT 18 in order to translate the destination address of the received packet from the global address C to the private address A (process 611). Further, the HA 16 of the router 12 recognizes by a registration request in the process 603 that the mobile node 10 is under a management network of the FA 17. The HA 16 IP-encapsulates the address translated packet (process 611) and tunneling-transfers it to the FA 17 of the router 15 (process 612). The FA 17 of the router 15 decapsulates the tunneling-transferred packet in order to obtain the original packet whose destination address is the private address A (process 613). The original packet obtained by the decapsulation is sent to the mobile node 10 (process 614).

In this way, communication becomes possible between the mobile node 10 in the foreign network 21 and the correspondent node 11 on the IP network. Particularly, when the mobile node itself to which a private address is assigned obtains address translation information, communication is possible in a foreign network which is a global network without addition of functions to an FA (foreign network) as much as possible thereby.

Seventh Embodiment

In the sixth embodiment, the mobile node 10 uses a registration response as a trigger in order to obtain address translation information. In a seventh embodiment, a registration request sent from the mobile node 10 to the FA 17, a registration request sent from the FA 17 to the HA 16, a registration response sent from the HA 16 to the FA 17, and a registration response sent from the FA 17 to the mobile node 10 are extended respectively so that the mobile node 10 can obtain address translation information.

Figure 17:
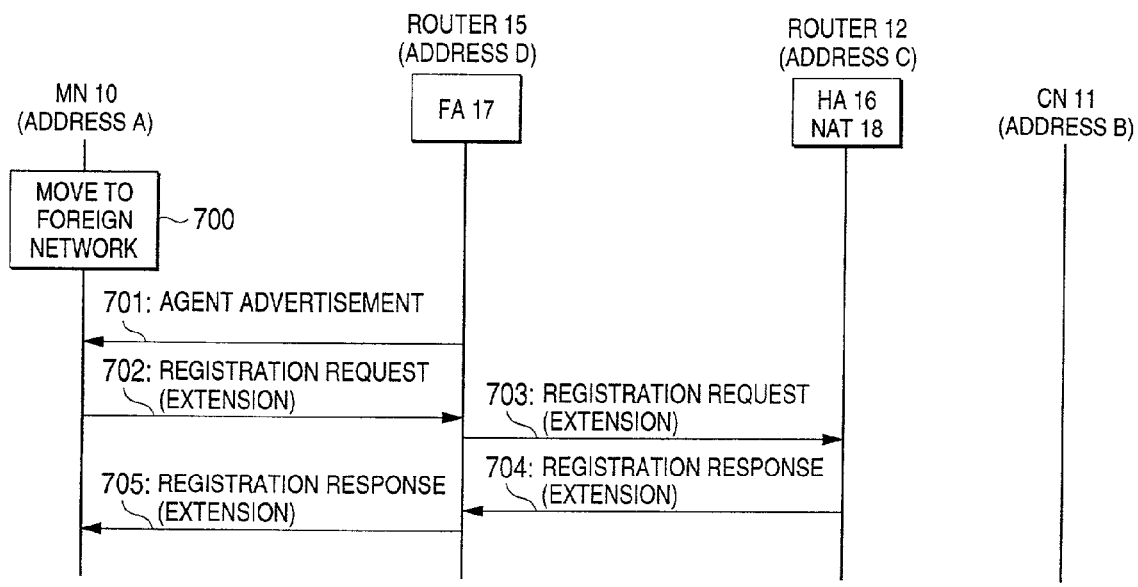
FIG. 17 is a diagram for exemplifying a communication sequence according to a seventh embodiment of the present invention.

FIG. 17 shows a sequence where, in the network construction shown in FIG. 14, an address translation information request is added to a registration request message, and the address translation information is added to a registration response message, so that the mobile node 10 obtains address translation information from the NAT 18 of the router 12. In a process 700 in FIG. 17, the mobile node 10 is moved from the home network 20 to the foreign network 21 (process 700). The mobile node 10 receives an agent advertisement so that it can detect that it has moved to the foreign network 21 (process 701).

The mobile node 10 having detected the movement in the process 701 performs an extended registration request in order to request its address translation information to the FA 17 (process 702). More particularly, an extended registration request message which is made by adding the number of address translation information requests 42 and the home address 43 shown in FIG. 11 to the format shown in FIG. 4 is sent to the FA 17. The FA 17 receives the extended registration request message in order to perform a predetermined registration. The, the message is sent to the router 12 (process 703). The router 12 receives the message and performs a predetermined registration in the HA 16. Also, the extended registration response is sent to the FA 17 by including address translation information regarding the mobile node 10 in the message (process 704). More specifically, an extended registration response message by adding the address translation information 32, the home address 33, and the translation address 34 shown in FIG. 9 to the format shown in FIG. 5 is sent to the FA 17. the extended registration response message is further sent from the FA 17 to the mobile node 10 (process 705). Thus, the registration is completed, and address translation information regarding the mobile node 10 is set in the mobile node 10.

As described above, an address translation information request message is added to a registration request message for transmission, which can reduced a number and time for sending a message required from the registration request to obtaining the address translation information.

Eighth Embodiment

Figure 18:
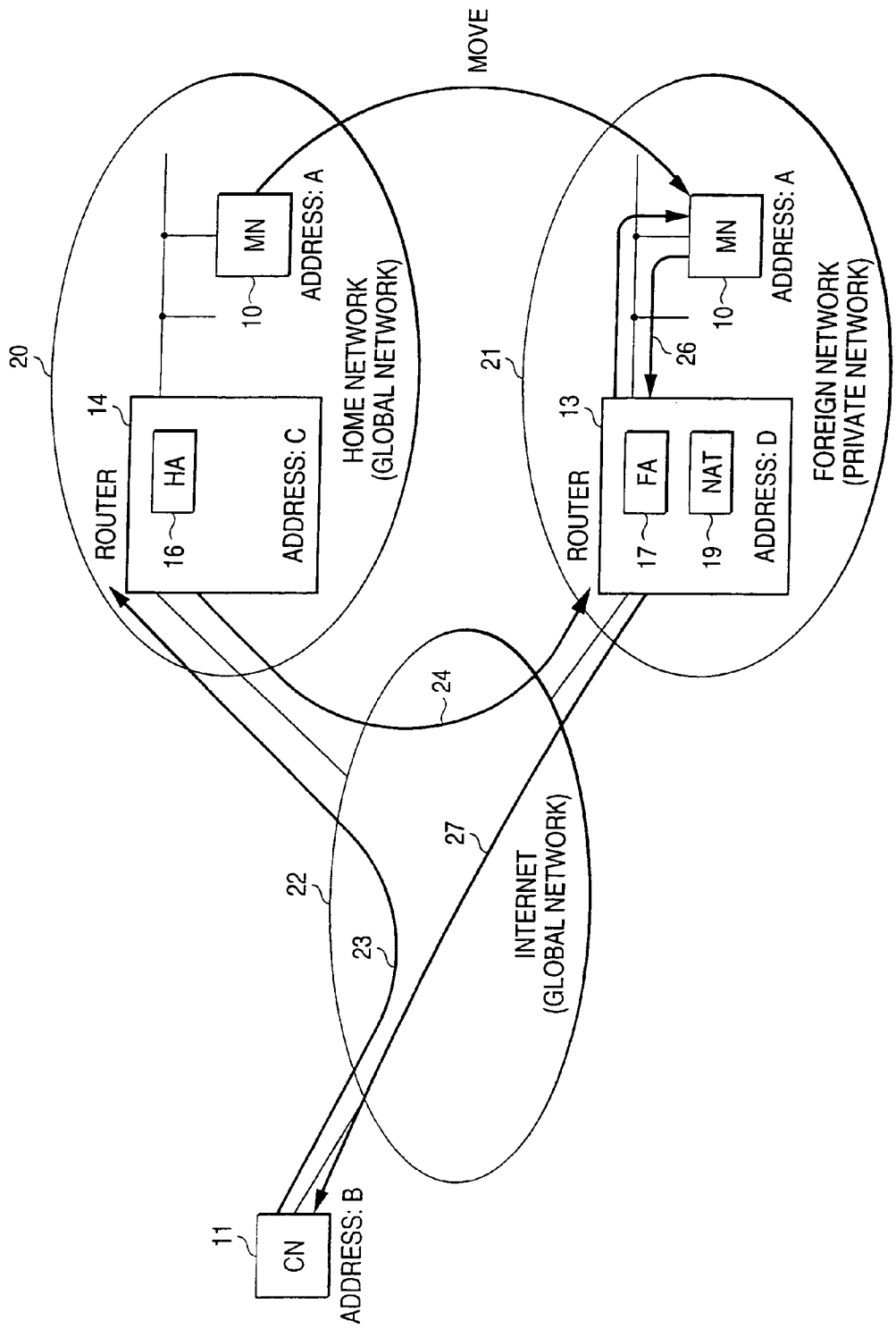
FIG. 18 is a construction diagram for exemplifying a communication system according to a eighth embodiment of the present invention.

In the first embodiment, both home network 20 and foreign network 21 have NATs. In a eighth embodiment, it will be described a case where the home network 20 does not have a NAT while the foreign network 21 has the NAT. A global address is assigned to the mobile node 10 here. FIG. 18 is an explanatory diagram for exemplifying a network construction and its packet transfer path according to the eighth embodiment. In FIG. 18, identical reference numerals will be given to identical or corresponding parts in FIG. 6, and their description will be omitted here.

In FIG. 18, the home network 20 is a global network using a global address. The router 14 does not have a NAT function. More specifically, the router 14 has functions of the HA 16 and connects the IP network 22 and the home network 20. The foreign network 21 is a private network using a private address. The router 15 has functions of the FA 17 and NAT 19 and connects the IP network 22 and the foreign network 21. A global address A, a global address B, a global address C, and a global address D are assigned to a home address of the mobile node 10, the correspondent node 11, the router 14, and the router 13, respectively.

FIG. 19 is an explanatory diagram for exemplifying a sequence where, in a network construction shown in FIG. 18, the mobile node 10 is moved from the home network 20 to the foreign network 21 during communication with the correspondent node 11. In FIG 19, 800 to 818 indicate processes, respectively. In the process 800 in FIG. 18, the mobile node 10 in the home network 20 sends a packet to the router 14 in order to send data to the correspondent node 11. A destination address of the packet is a global address B while its sender address is a private address A. The router 14 receives the packet and send it to the correspondent node 11 (process 801). The correspondent node 11 sends the packet whose destination address is a global address A which is a sender address of the received packet as a response to the packet from the router 14 (process 802). The packet is received by the router 14 (process 802) and then is sent from the router 14 to the correspondent node 11 (process 803). In this way, communication is performed between the mobile node 10 in the home network 20 and the correspondent node 11 on the IP network.

During communication as above, the mobile node 10 is moved from the home network 20 to the foreign network 21 (process 804). The mobile node 10 receives an agent advertisement so that it detects that it has moved to the foreign network 21 (process 805). The mobile node 10 having detected the movement requests a registration to the FA 17 of the router 13 by using the format shown in FIG. 4 (process 806). FA 17 receives the registration request and further performs a similar registration request to the HA 16 (process 807). HA 16 returns a registration response to the registration request by using the format shown in FIG. 5 (process 808). According to the home address of the mobile node 10 included in the response, the FA 17 can recognize that a global address is assigned to the mobile node 10. That is, it recognizes that address translation is not performed by a NAT in the home network 20 and address translation is not necessary for the packet from the mobile node 10.

The FA 17 of the router 13 which has recognized that address translation is not necessary for the home address A of the mobile node 10 registers it in an address non-translated list (process 809). The address non-translated list is a list for registering IP addresses on which the NAT 19 of the router 13 perform address translation. FIG. 20 is an explanatory diagram for exemplifying the address non-translated list. Here, an address A is registered, and the NAT 19 does not perform NAT translation on the address A registered in the list. After that, a registration response is returned from the FA 17 to the mobile node 10 in order to complete the registration (process 810).

Next, it will be described a case where data is sent from the mobile node 10 in the foreign network 21 to the correspondent node 11. In a process 811, the mobile node 10 in the foreign network 21 sends a packet to the router 13 in order to send data to the correspondent node 11 (process 811). A destination address of the packet is a global address B while its sender address is a global address A. The NAT 18 of the router 13 having received the packet from the mobile node 10 does not perform address translation on the global address A based on the address non-translated list shown in FIG. 20 (process 812). The non-translated packet is sent onto the IP network 22 and received by the correspondent node 11 (process 813).

The correspondent node 11 sets the address A which is a sender address of the earlier received packet as its destination address and transmits the packet in order to transmit the packet to the mobile node 10 (814). The HA 16 of the router 14 having received the packet from the correspondent node 11 sets address D of the router 13 and address C of the router 14 in the destination address and the sender address, respectively, and performs IP-encapsulation thereon (process 815). The IP encapsulated packet is tunneled to the FA 17 of the router 13 (process 816). The router 13 of the FA 17 decapsulates the tunneled packet while does not perform address translation through the NAT 19 based on the address non-translated list (process 817). Then, the decapsulated packet is sent to the mobile node 10 (process 818). In this way, communication becomes possible between the mobile node 10 in the foreign network 21 and the correspondent node 11 on the IP network.

The global addresses which are assigned to the router 12, HA 16, and NAT 18 in FIG. 6 has been described above as a single address C. However, different global addresses may be assigned, respectively. Similarly, different global addresses may be assigned to the router 13, the FA 17, and the NAT 19, respectively.

A method such as for example the above is stored on computer readable medium such as HARD DISK, FLOPPY DISK, CDROM, DVDROM, MEMORY.

What is claimed is:

1. A method for packet communication, comprising:
    before a first node moves from a first network to a second network
        receiving a first packet from said first node in said first network by a first address changing device in said first network, said first packet including a private sender address corresponding to said first node and destination address information corresponding to another node in a third network,
        changing said private sender address of said received first packet by the first address changing device from said private sender address to a global address, the changing performed by mapping the global address to the private sender address with first translation information held within said first address changing device, and
        sending the changed first packet from the first address changing device to the another node;
    after said first node moves from said first network to said second network
        receiving a second packet from the first node by a second address changing device in said second network, said second packet including said private sender address and said destination address information corresponding to the another node in the third network,
        sending a notification message from the second address changing device to the first address changing device indicating that the first node has contacted the second address changing device,
        sending sender address translation information from said first address changing device to said second address changing device so as to create second translation information in said second address translation device,
        changing said private sender address of said received second packet by the second address changing device from said private sender address to said global address, the changing performed by mapping the global address to the private sender address by said second translation information held within said second address changing device; and
        sending the changed second packet from the second address changing device to the another node; and
    periodically exchanging updated translation information between said first and second address changing devices.

2. A method for packet communication according to claim 1, further comprising:
    before said first node moves from said first network to said second network,
        receiving in said first address changing device a return packet from said another node in the third network, said return packet including said global address as a destination address, and
        changing said global address of said received return packet by the first address changing device from said global address to said private sender address, the changing performed by mapping the global address to the private sender address by said first translation information held within said first address changing device.

3. A method for packet communication according to claim 1, further comprising:
    after said first node moves from said first network to said second network
        receiving in said first address changing device a return packet from said another node in the third network, said return packet including said global address as a destination address,
        forwarding said received return packet from said first address changing device to said second address changing device, and
        changing said global address of said received return packet by the second address changing device from said global address to said private sender address, the changing performed by mapping the global address to the private sender address by said second translation information held within said second address changing device.

4. A method for packet communication according to claim 1, wherein said step of sending sender address translation information from said first address changing device to said second address changing device so as to create second translation information in said second address translation device comprises:

a first step of at least one of
- detecting by the second address changing device that a registration request is sent from said first node to a foreign agent configured to manage said second network,
- detecting by the second address changing device that a response indicating that said first node is registered has been sent from a home agent configured to manage said first network to said foreign agent configured to manage said second network, and
- monitoring a timer in at least one of said first and second address changing device; and a second step of requesting by the second address changing device in the second network that the first address changing device sends to the second address changing device the sender address translation information.

5. A method for packet communication according to claim 1, further comprising:
adding an address translation information request for requesting the global address mapped to the private sender address to a registration request sent from a foreign agent configured to manage said second network to a home agent configured to manage said first network.

6. A method for packet communication, comprising:
receiving a packet including a private sender address from a first node located in a first network, the first network including a first address changing device which receives the packet;
changing the address of said received packet by the first address changing device from said private sender address to a first global address by mapping the first global address to the private sender address by translation;
sending by the first address changing device said packet whose sender address has been changed to a third network different from said first network and a second network, the second network including a second address changing device;
receiving by the first address changing device a packet including a second global address, different from said first global address, from a second node which has been moved into said first network from the second network which is different from said first network;
notifying periodically the first address changing device by the second address changing device and the second address changing device by the first address changing device of an address translation information between said private sender address and said first global address after said changing of the address; and
sending by the first address changing device said packet received from said second node to the third network without changing an address of said packet received from said second node from said second global address to said first global address.

7. A method for packet communication, comprising:
before a first node moves from a first network to a second network
receiving a first packet from the first node in the first network by a first address changing device in said first network, said first packet including a private sender address corresponding to said first node and destination address information corresponding to another node in a third network,
changing said private sender address of said received first packet by the first address changing device from said private sender address to a global address, the changing performed by mapping the global address to the private sender address with first translation information held within said first address changing device, and
sending the changed first packet from the first address changing device to the another node; and
after said first node moves from said first network to said second network
receiving in the first address changing device a notification message from a second address changing device in the second network indicating that the first node has contacted the second address changing device,
sending sender address translation information from said first address changing device to said second address changing device so as to create second translation information in said second address translation device, thereby enabling a changing by the second address changing device of said private sender address of a second packet by the second address changing device from said private sender address to said global address, and enabling a relay of the changed second packet from the second address changing device to the another node, and
periodically exchanging updated translation information between said first and second address changing devices.

8. The method of claim 7, further comprising:
before said first node moves from said first network to said second network,
receiving in said first address changing device a return packet from said another node in the third network, said return packet including said global address as a destination address; and
changing said global address of said received return packet by the first address changing device from said global address to said private sender address, the changing performed by mapping the global address to the private sender address by said first translation information held within said first address changing device.

9. The method of claim 7, further comprising:
after said first node moves from said first network to said second network
receiving in said first address changing device a return packet from said another node in the third network, said return packet including said global address as a destination address; and
forwarding said received return packet from said first address changing device to said second address changing device without changing said global address to said private sender address.

10. The method of claim 7, wherein said step of sending sender address translation information from said first address changing device to said second address changing device comprises:
a first step of at least one of
receiving notification of a detection by the second address changing device of the second network that a registration request is sent from said first node to a foreign agent configured to manage said second network,
receiving notification of a detection by the second address changing device in the second network that a response indicating that said first node is registered has been sent from a home agent configured to manage said first network to the foreign agent configured to manage said second network, and processing timer information corresponding to a timer in at least one of said first and second address changing device; and a second step of receiving a request from the second address changing device that the first address changing device send to the second address changing device the sender address translation information.

11. A method for packet communication, after a first node moves from a first network to a second network, said first network including a first address changing device configured to a) receive a first packet from the first node, said first packet including a private sender address corresponding to said first node and destination address information corresponding to another node in a third network, b) change said private sender address of said received first packet from said private sender address to a global address by mapping the global address to the private sender address by first translation information held within said first address changing device, and c) send the changed first packet from the first address changing device to the another node, the method comprising:

receiving a second packet from the first node by a second address changing device in said second network, said second packet including said private sender address and said destination address information corresponding to the another node in the third network;

sending a notification message from the second address changing device to the first address changing device that the first node has contacted the second address changing device;

receiving sender address translation information from said first address changing device at said second address changing device so as to create second translation information in said second address translation device;

changing said private sender address of said received second packet by the second address changing device from said private sender address to said global address, the changing performed by mapping the global address to the private sender address by said second translation information held within said second address changing device;

sending the changed second packet from the first address changing device to the another node; and periodically exchanging updated translation information between said first and second address changing devices.

12. The method of claim 11, further comprising:

receiving from said first address changing device a return packet sent to said first address changing device from said another node in the third network, said return packet including said global address as a destination address; and changing said global address of said received return packet by the second address changing device from said global address to said private sender address, the changing performed by mapping the global address to the private sender address by said second translation information held within said second address changing device.

13. The method of claim 11, further comprising:

wherein said step of receiving sender address translation information from said first address changing device at said second address changing device so as to create second translation information in said second address translation device comprises:

a first step of at least one of detecting by the second address changing device that a registration request is sent from said first node to a foreign agent configured to manage said second network, detecting by the second address changing device in the second network that a response indicating that said first node is registered has been sent from a home agent configured to manage said first network to said foreign agent configured to manage said second network, and monitoring a timer in at least one of said first and second address changing device; and a second step of requesting by the second address changing device that the first address changing device sends to the second address changing device the sender address translation information.

14. A computer program product stored on a tangible computer readable medium, comprising:

instructions to cause a computer controlled device to carry out the method recited in any one of claims 7-10.

15. A computer program product stored on a tangible computer readable medium, comprising:

instructions to cause a computer controlled device to carry out the method recited in any one of claims 11-13.

16. A packet communication device, comprising:

an address changing device configured to perform the method recited in any one of claims 7-10.

17. A packet communication device, comprising:

an address changing device configured to perform the method recited in any one of claims 11-13.

18. A communication system, comprising:

a first address changing device in a first network configured to change a sender address of a packet from a local address to a global address, the packet sent from a node in the first network; and a global address sending device in the first network configured to send said global address, used for the node when the node was in the first network, to a second address changing device in a second network when the node moves from said first network to said second network, and configured to periodically notify the second address changing device of address translation information between said sender address and said global address after said first address changing device changed the address.

19. A communication system, comprising:

a first address changing device in a first network configured to change a sender address of a packet from a local address to a global address, the packet sent from a node in the first network; and a global address receiving device in a second network configured to receive said global address, used for the node when the node was in the first network, from said first address changing device when the node moves from said first network to said second network, and configured to periodically receive from the first address changing device address translation information between said sender address and said global address after said first address changing device changed the address.

* * * * *